July 11, 1961
B. C. PRATT
2,992,425
NONDIRECTIONAL, METAL-BACKED, ELECTROMAGNETIC
RADIATION-ABSORPTIVE FILMS
Filed Oct. 12, 1945
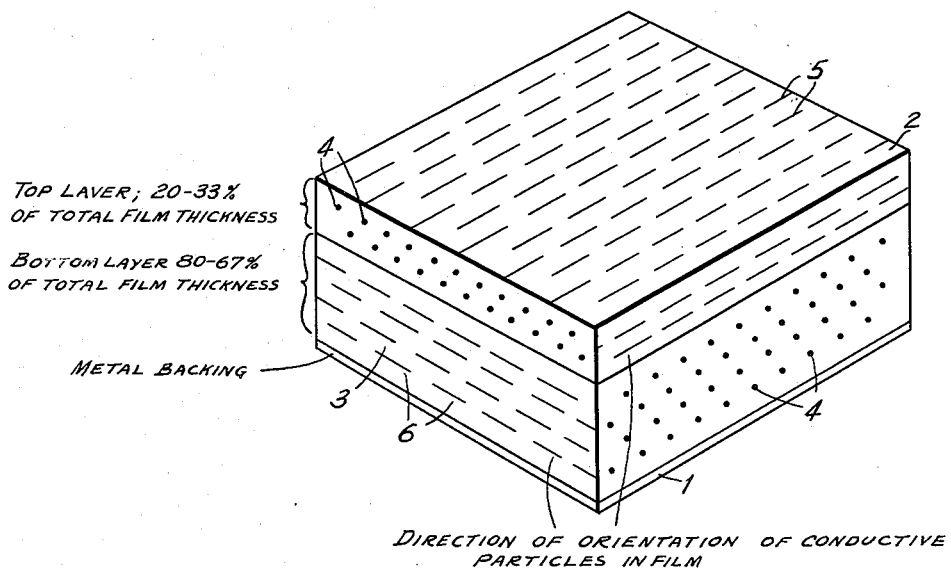
Inventor:
BURT CARLTON PRATT
By R. F. Miller
Attorney:

United States Patent Office 2,992,425
Patented July 11, 1961

2,992,425
NONDIRECTIONAL, METAL-BACKED, ELECTROMAGNETIC RADIATION-ABSORPTIVE FILMS
Burt Carlton Pratt, Brandywine Hundred, Del., assignor to E. I. du Pont de Nemours and Company, Wilmington, Del., a corporation of Delaware
Filed Oct. 12, 1945, Ser. No. 622,103
3 Claims. (Cl. 343—18)

This invention relates to electromagnetic radiation-absorptive articles. More particularly, it relates to such articles having improved properties and to a process for making them.

For certain purposes it is desired to have a relatively thick pigmented film to be used for absorbing electromagnetic radiations of a given frequency, which is nondirectional, i.e., the film has the characteristic of absorbing to substantially the same degree plane polarized electromagnetic radiations of a given frequency striking its surface at a given angle of incidence, when the film is rotated in its plane through 90°, the angle of incidence of the radiations being maintained constant. To prepare quite thick films, the most practical procedure is to laminate a number of separate thinner films of the desired type (i.e., containing the desired pigment in the desired amount) which have been prepared by conventional film-forming methods such as calendering, extrusion of plastic compositions, and slicing of blocks formed by fusing plastic sheets together under pressure. These film-forming methods produce films which are usually more or less directional in their effect on electromagnetic radiations because of the orientation of the pigment during the preparation of the films. The individual pigment particles used in such radiation-absorptive films, e.g., metallic flakes, and finely divided carbon, are not uniform in all their dimensions, but usually have one axis greater than the others. Consequently, when compositions containing such pigments are formed into films by methods such as those mentioned above, the individual pigment particles tend to become arranged, or oriented, in a parallel manner with respect to their longest axis. This parallel arrangement of the pigment particles is the cause of differences in the amount of absorptivity by the films when the plane of polarization of the radiations is at different angles to the direction of orientation of the pigment. The composite film would also be expected to be directional, which is in fact the case, not only when the separate films are all arranged in the direction in which they were prepared and therewith their orientation but also when half of them are cross-laminated, i.e., placed so that the direction of orientation therein is at an angle of 90° to the direction of orientation of the remaining laminae. Such composite films are unsatisfactory for those applications where the metal-backed, electromagnetic radiation-absorptive film must be substantially completely nondirectional.

This invention has as an object an electromagnetic radiation-absorptive article which is substantially nondirectional. A further object is a process for making articles of this kind. Other objects will appear hereinafter.

These objects are accomplished by means of an electromagnetic radiation-absorptive article which comprises a metal-backed laminated, pigmented electromagnetic radiation-absorptive film in which the orientation of the pigment in the outer 20 to 33% of the film thickness is at a right angle to the orientation in the remainder of the film, the degree of orientation being substantially the same in both layers. Such cross-laminated, metal-backed films are substantially nondirectional in that they have substantially the same effect on all plane polarized electromagnetic radiations striking the surface of the film at a given angle of incidence irrespective of the angle between a given line in the plane of the film, and the line formed by the intersection of the plane of polarization of the radiations with the film.

The single figure in the drawing is a view in perspective of an electromagnetic radiation-absorptive article made in accordance with the practice of my invention.

The numeral 1 indicates a metal backing to which is attached the electromagnetic radiation-absorptive film which for purpose of illustration is shown exaggerated as to thickness and which is composed of a top layer 2 and a bottom layer 3. Each of the layers 2 and 3 of the film contains dispersed therein electrically conducting particles shown in end view by the numeral 4. Essentially all of these particles, which are of pigment size, have one axis longer than the other. In both layers 2 and 3 the particles are oriented with their longer axes parallel and in the plane of the film. The direction of orientation in the top layer, which is indicated by the broken lines 5, is at right angles to the direction of orientation in the bottom layer, which is indicated by the broken lines 6.

The above described article is obtained by laminating a plurality of electromagnetic radiation-absorptive films having substantially the same degree of directionality in such a manner that the composite film contains two layers, in each of which the direction of orientation of the pigment in the individual films is the same, with the direction of orientation of the top layer at a right angle to that of the bottom layer, the thickness of the top layer being between 20 and 33% of the total film thickness; and joining the composite film to a metal backing.

By "electromagnetic radiation-absorptive film" is meant a pigmented film which, when joined to a metal backing, is capable of absorbing electromagnetic radiations which strike the surface of the film.

The invention is illustrated in greater detail by the following examples in which the proportions of ingredients are expressed as parts by weight unless otherwise specified.

*Example 1*

| Ingredients: | Parts by weight |
|---|---|
| Diene-modified isobutylene polymer | 350 |
| Channel back | 175 |
| Graphite | 220 |
| Paraffin | 3.5 |
| Tetramethylthiuram disulfide | 3.5 |
| Rubber accelerator known commercially as "Polyac" | 1.8 |
| Zinc oxide | 17.5 |
| Sulfur | 7 |

The above ingredients are mixed in a rubber mill until uniform and the resulting homogeneous stock is sheeted and calendered at 45–49° C. into films 25 mils and 40 mils (0.025 inch and 0.040 inch, respectively) thick which are then cut into 10-inch squares. A sheet of dead-soft aluminum foil 10 inches square and 2 mils thick is sprayed with a thin coat of a solution of maleic acid-modified interpolymer of vinyl chloride and vinyl acetate in a mixture of equal parts of methyl ethyl ketone, methyl isobutyl ketone and xylene. After the coating is air dried for ¾ hour, three of the calendered films of 40 mils thickness are stacked on the coated surface of the foil with the direction of orientation, i.e., the direction in which the film has passed through the calender, of each parallel to that of the others. On these are next placed two of the calendered films of 25 mils thickness in such a manner that the direction of orientation of each is parallel to that of the other but at right angles to that of the lower three films. A sheet of cellophane is finally placed on top of the stack and a cloth wrapped around the entire assembly, which is then pressed for 50 minutes at 140° C. in a hydraulic press at 32 lb./sq. in. After cooling under pressure for 40 minutes, the combined foil-backed sheet is removed and the cellophane stripped from the top. The total thickness of the combined film is 190–195 mils, and the orientation of the top 29% of this film is at right angles to that of the lower 71%. The thick foil-backed films are nondirectional when tested electrically, i.e., the absorption of plane polarized electromagnetic radiations having a frequency of about $3 \times 10^9$ cycles per second striking the film at a given angle of incidence is substantially the same irrespective of the angle between a given line in the plane of the film and the line formed by the intersection of the plane of polarization of the beam of radiations with the film.

Carbon pigmented films of the kind described in the foregoing example and their application to a metal backing are claimed in my copending application Serial No. 617,693, filed September 20, 1945.

*Example II*

| Ingredients: | Parts by weight |
|---|---|
| Solid polyethylene | 420 |
| Polyisobutylene (polymer known commercially as "Vistanex B-80") | 140 |
| Finely divided steel flake | 374 |

These ingredients are mixed uniformly together in a rubber mill, the resulting stock is sheeted from the rolls, and calendered at 113–118° C. into a film 9 inches wide and 25–27 mils thick which is then cut into 9-inch squares. A sheet of aluminum foil 9 inches square is coated with the adhesive known commercially as "Pliobond" to give a film after drying in air, of about 0.5 mil thickness. This "Pliobond" coated foil is then coated with a 0.5 mil layer of a mixture of three parts of polyisobutylene and two parts of the terpene resin known commercially as "Piccolyte" in 25 parts of toluene. After the coated foil is air dried, seven of the calendered films described above are stacked on the coated surface of the foil with the direction of orientation of each parallel to that of the others. On these are next placed two more of the calendered films in such a manner that the direction of orientation of each is parallel to that of the other but at right angles to that of the lower seven films. A sheet of cellophane is finally placed on top of the stack which is then pressed for 5 minutes at a temperature of about 127° C. in a hydraulic press at 1000 lbs./sq. in. pressure, with shims between the platens of the press of sufficient thickness to give a foil-backed composite sheet, after removal from the press, of about 204 mils thickness. The orientation of the top 22% of this film is at right angles to that of the lower 78%. This foil-backed film absorbs substantially completely electromagnetic radiations having a frequency of about $3 \times 10^9$ cycles/second and is substantially nondirectional.

Polymers of monoolefinic hydrocarbons as the binder for films which are of the kind described in the foregoing example and which are pigmented with metal flake and attached to a metal backing are claimed in my copending application Serial No. 590,747, filed April 27, 1945.

*Example III*

| Ingredients: | Parts by weight |
|---|---|
| Polymeric 2-chlorobutadiene-1,3 (polymer known commercially as neoprene) | 25.875 |
| Sodium acetate trihydrate | 0.312 |
| Light calcined magnesium oxide | 1.0 |
| Stearic acid | 0.125 |
| Crown Clay | 9.125 |
| Mixture of waxes known commercially as "Heliozone" | 1.312 |
| Semi-reinforcing furnace black | 14.0 |
| Phenyl-beta-naphthylamine | 0.50 |
| Finely divided nickel flake | 15.375 |
| Light mineral oil | 1.312 |
| Zinc oxide | 1.312 |

These ingredients are mixed together in a rubber mill until homogeneous and the resulting stock is calendered at a temperature of about 65° C. into films 7 mils, 27 mils and 29 mils thick which are then cut into 10-inch squares. A sheet of aluminum foil 10 inches square and 2 mils thick, one surface of which has been roughened slightly by abrasion, is coated on the roughened side with the adhesive solution known commercially as "Pliobond," the adhesive layer being about 0.5 mil thick after air-drying. Eleven (11) of the calendered films of 7 mils thickness are stacked on the coated surface of the foil with the direction of orientation of each parallel to that of the others. On these are next placed four calendered films of 7 mils thickness in such a manner that the direction of each is parallel to that of the others but at right angles to that of the lower eleven films. A sheet of cellophane is finally placed on top of the stack which is then pressed for 30 minutes at 140° C. in a hydraulic press at 1000 lbs./sq. in. pressure, with brass shims of 96 mils thickness placed between the platens of the press. After cooling under pressure, the foil-backed film is removed from the press. The total thickness of the press-laminated film is 84.3 mils and the orientation of the top 26.7% of this film is at right angles to that of the lower 73.3%. It absorbs substantially completely all plane polarized electromagnetic radiations having a frequency of $9 \times 10^9$ cycles per second, and is substantially nondirectional.

*Example IV*

Three 10-inch sections of the calendered films of 27 mils thickness of Example III are arranged with their direction of orientation parallel and are placed on top of a 10-inch square of aluminum foil of 2 mils thickness having a coating of about 0.5 mil thickness of the adhesive known commercially as "Pliobond." One of the 10-inch sections of the calendered films of 29 mils thickness of Example III is then placed on top of the three 27-mil films with its direction of orientation at right angles to that of the lower three films. A sheet of cellophane is finally placed on top of the stack which is then pressed for 30 minutes at 140° C. in a hydraulic press at 1000 lbs./sq. in. pressure, with shims of 96 mils thickness between the platens of the press. After cooling under pressure, the laminated film is removed from the press. It has a thickness of 86.5 mils with the top 26.4% having its direction of orientation at right angles to that of the lower 73.6%. It absorbs substantially completely all plane polarized electromagnetic radiations having a frequency of $9 \times 10^9$ cycles/second which strike the surface of the film, and it is substantially nondirectional.

The press curing described in the above examples of laminated, electromagnetic radiation-absorptive films is claimed in my copending application Serial No. 642,119, filed January 18, 1946.

The nondirectional films of this invention can be prepared by disproportionately cross-laminating, within the limits specified above, any number of directional films of appropriate thickness, containing other ingredients, and made by methods other than those described in the example. It is essential, however, that the degree of orientation of the pigment be substantially the same in all the laminae of the composite film.

In place of the graphite, carbon blacks, steel flake and nickel flake of the examples, other active ingredients, i.e., electrically conducting particles which can similarly be directionally oriented in the film binder, can be employed. Examples of others which may be used include metals such as aluminum, copper, bronze, magnesium, the nickel-iron alloy known as "Permalloy," silver, zinc, gold and lead in the form of flakes, and other forms of carbon such as thermal black and acetylene black. These active ingredients can be used in various proportions depending on the particular material and the properties desired in the film. Films containing from 10 to 72% by weight of a form of powdered carbon having an absolute density less than three, or from 10 to 95% by weight of metal flakes, are useful in various applications. Likewise films containing intermediate proportions of these metallic or nonmetallic pigments or various combinations of them are useful in other applications.

In place of the diene-modified isobutylene polymer, the solid polyethylene, and the polymeric chlorobutadiene of the examples, other film-forming organic polymers can be employed as the vehicle or binder in these cross-laminated non-directional films. Examples of other polymers which can be used include ethyl cellulose, polystyrene, polyisobutylene, polybutadiene, natural rubber, chlorinated rubber, interpolymers of butadiene with other polymerizable materials such as styrene and acrylonitrile, polyvinyl chloride, polyvinylidene chloride, interpolymers of vinyl chloride with other polymerizable materials such as vinyl acetate and vinylidene chloride, polymethyl methacrylate, polyvinyl acetate, etc. The particular vehicle employed is selected on the basis of the particular properties desired in the final film and on the particular film-forming method being used.

Various auxiliary components such as plasticizers, roll release agents, hardening agents, extenders, fillers, reinforcing agents and rust inhibitors may be used in the film as needed or desired to improve the physical properties of the film provided their nature and amount are such as not to modify unduly the electrical characteristics of the final film.

The individual films, which are disproportionately cross-laminated to give the nondirectional films of this invention, can be prepared by any of the customary methods for preparing directional films. The calendering method described in the examples is one of the most practical methods for forming relatively thick directional films. However, other methods which are suitable include knifing, roller coating, brushing, spraying, and slicing of pressed blocks.

As indicated previously the metal-backed films of this invention, having a top cross-laminated layer amounting to from 20 to 33% of the total film thickness, are, in general, useful for absorbing plane polarized electromagnetic radiations having a frequency of from $10^6$ to $10^{11}$ cycles/second.

As many apparently widely different embodiments of this invention may be made without departing from the spirit and scope thereof, it is to be understood that I do not limit myself to the specific embodiments thereof except as defined in the appended claims.

I claim:

1. An electromagnetic radiation-absorptive article provided with a metal backing having attached thereto a film which is nondirectional in that, when rotated in its plane through 90°, it absorbs to substantially the same degree plane polarized electromagnetic radiations of a given frequency striking its surface at a given angle of incidence, said non-directional film being composed of a top and bottom layer each of which contains electrically conducting particles directionally oriented in the plane of the film such that said particles, in substantially the same amount in each of said layers, are arranged essentially parallel with respect to their longest axis, said top layer constituting from 20% to 33% of the total film thickness and the bottom layer constituting the remainder of the film thickness, the direction of the orientation of said particles in said top layer being at right angles to that of said bottom layer.

2. An electromagnetic radiation-absorptive article comprising a laminated, pigmented electromagnetic radiation-absorptive film which consists of an outer layer constituting from 20% to 33% of the total film thickness, and of a bottom layer constituting the remainder of the film thickness, said layers being pigmented with flake metal particles oriented in the plane of the film such that said particles, in substantially the same amount in each of said layers are arranged essentially parallel with respect to their longest axis, the direction of orientation of the pigment in said outer layer being at a right angle to that in said bottom layer, and a metal backing attached to said bottom layer.

3. An electromagnetic radiation-absorptive article comprising a laminated, pigmented electromagnetic radiation-absorptive film which consists of an outer layer constituting from 20% to 33% of the total film thickness, and of a bottom layer constituting the remainder of the film thickness, said layers being pigmented with carbon particles oriented in the plane of the film such that said particles, in substantially the same amount in each of said layers are arranged essentially parallel with respect to their longest axis, the direction of orientation of the pigment in said outer layer being at a right angle to that in said bottom layer, and a metal backing attached to said bottom layer.

References Cited in the file of this patent

UNITED STATES PATENTS

| | | |
|---|---|---|
| 1,576,730 | Harth | Mar. 16, 1926 |
| 2,293,839 | Linder | Aug. 25, 1942 |